United States Patent
Takahashi et al.

(10) Patent No.: US 7,062,373 B2
(45) Date of Patent: Jun. 13, 2006

(54) MISFIRE DETECTION APPARATUS OF INTERNAL COMBUSTION ENGINE

(75) Inventors: Yasuhiro Takahashi, Tokyo (JP); Koichi Okamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 581 days.

(21) Appl. No.: 10/273,259

(22) Filed: Oct. 18, 2002

(65) Prior Publication Data

US 2003/0197511 A1 Oct. 23, 2003

(30) Foreign Application Priority Data

Apr. 17, 2002 (JP) .................................... P.2002-114708

(51) Int. Cl.
*F02P 17/00* (2006.01)

(52) U.S. Cl. ................. 701/114; 701/110; 701/115; 123/406.59; 123/406.65; 73/35.08

(58) Field of Classification Search ................. 701/114, 701/115, 111, 110; 123/406.13, 406.27, 406.59, 123/406.65; 73/35.08, 117.3
See application file for complete search history.

(56) References Cited

U.S. PATENT DOCUMENTS 5,563,332 A * 10/1996 Yasuda ....................... 73/35.08
5,592,926 A * 1/1997 Miyata et al. ............... 123/630
5,701,876 A * 12/1997 Morita et al. ................ 123/630
6,550,456 B1 * 4/2003 Uchida et al. .......... 123/406.14

FOREIGN PATENT DOCUMENTS

| JP | 6-137250 A | 5/1994 |
| JP | 9-72268 A | 3/1997 |
| JP | 10-252635 | 9/1998 |
| JP | 2003-314423 A * | 11/2003 |

* cited by examiner

*Primary Examiner*—Hieu T. Vo
(74) *Attorney, Agent, or Firm*—Sughrue Mion, PLLC

(57) ABSTRACT

A misfire detection apparatus of an internal combustion engine. The misfire detection apparatus includes an angle sensor for detecting rotation angle of the internal combustion engine, an ECU for performing fuel injection and ignition control based on rotation information of the angle sensor, an ignition coil for generating a high voltage for ignition based on a drive signal from the ECU, and an spark plug, as the high voltage for ignition of the ignition coil is applied, for generating an ignition spark and igniting an air fuel mixture. The misfire detection apparatus applies a bias voltage to the spark plug, detects an ion current, makes a misfire determination based on the ion current detection, and makes a failure determination based on time change of rotation information of the internal combustion engine when misfires occur successively in a specific cylinder of the internal combustion engine.

7 Claims, 8 Drawing Sheets

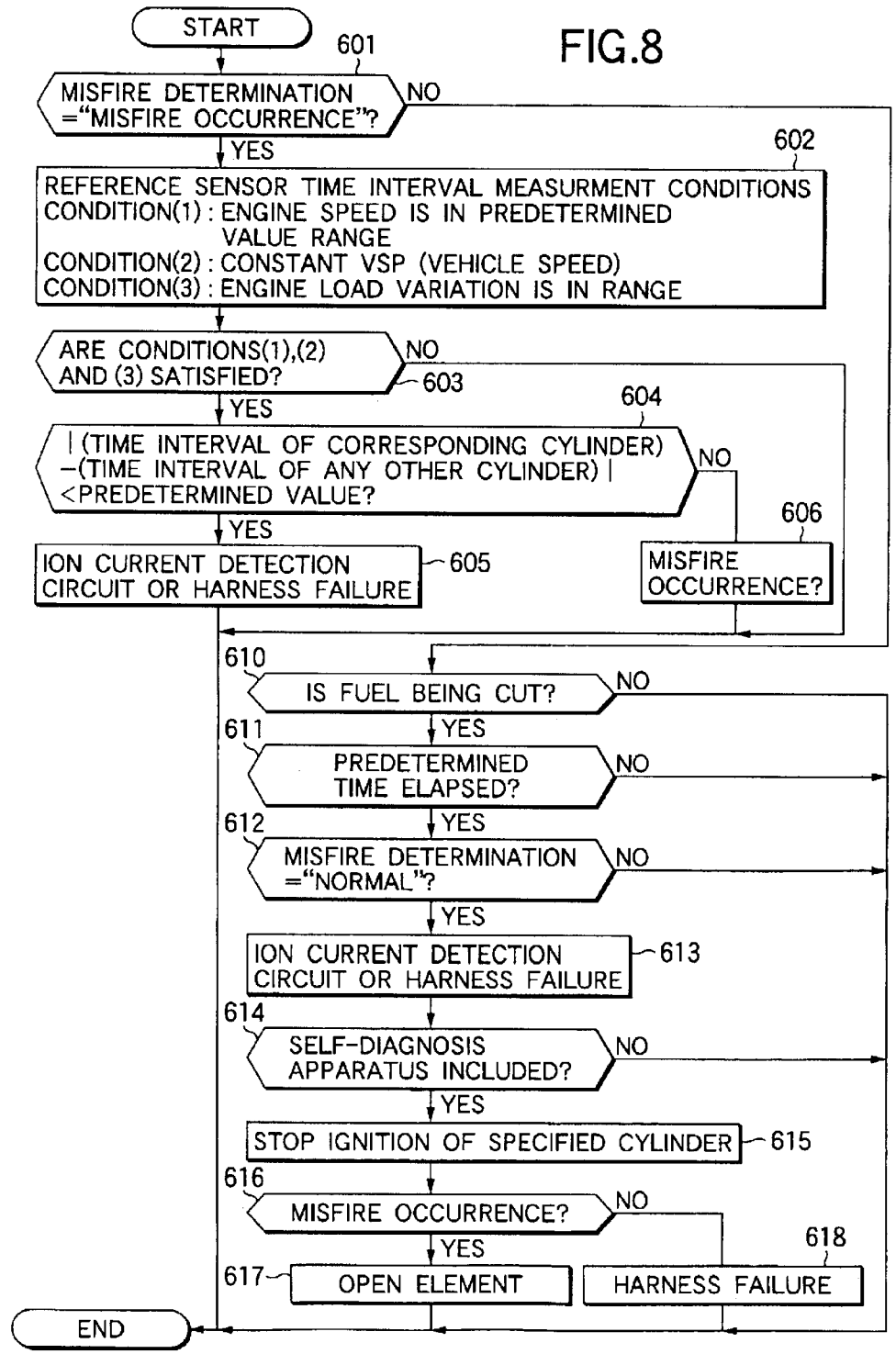

MISFIRE DETECTION APPARATUS OF INTERNAL COMBUSTION ENGINE

BACKGROUND OF THE INVENTION

1. Field of the Invention

This invention relates to a misfire detection apparatus of an internal combustion engine for detecting the amount of ions produced by combustion in an internal combustion engine, thereby detecting occurrence of a misfire in the internal combustion engine and in particular to a misfire detection apparatus with a failure diagnosis function comprising a diagnosis function for determining whether or not the condition is a misfire detection failure caused by ion current if it is determined that the condition is a misfire based on ion current.

2. Background Art

Hitherto, for example, JP-A-10-252635 has disclosed a misfire detection apparatus using ion current detection means and comprising failure determination means based on rotation fluctuation of an internal combustion engine.

FIG. 6 is a drawing to show an ion current detection circuit in a related art example, FIG. 7 is a control block diagram in the related art example, and FIG. 8 is a flow chart of failure diagnosis in the related art example.

In FIG. 6, a circuit consisting of a Zener diode 302, a charge capacitor 303, a diode 304, and a detection resistor 305 is inserted between a secondary low-voltage terminal of an ignition coil 301 and GND. When an ignition signal is applied to an igniter 112, an electric current starts to flow into a primary coil of the ignition coil 301. If the ignition signal is reset to zero in a predetermined energization time, the current flowing into the primary ignition coil becomes zero. Energy stored in the ignition coil 301 causes the secondary coil to produce a high voltage, starting combustion. The charge capacitor 303 stores a current at the sparking time and is charged to the Zener voltage of the Zener diode 302. When spark disappears, the charge current becomes zero, but the voltage charged in the charge capacitor 303 is applied to a spark plug 107 and a discharge current into the ignition coil 301 and the periphery of the spark plug 107 flows.

Then, an ion current proportional to the ion amount in a combustion chamber flows. The ion current is integrated, whereby the combustion state can be grasped. That is, when a misfire occurs, no ions occur because of no combustion and a waveform corresponding to an ion current does not occur in output of an ion current detection circuit, but the ion current waveform occurs at the combustion time. Therefore, misfire determination means 206 determines whether or not the ion current waveform exists, whereby whether the condition is normal combustion or a misfire can be determined. That is, with the discharge start timing as a start trigger, misfire determination means 206 inputs an output signal of an ion current detection circuit 210 in a predetermined time, and compares the output signal with a threshold value, and if the output signal is equal to or less that the threshold value, determines that the condition is a misfire.

The ion current detection circuit in FIG. 6 is described as sensing means 210 in FIG. 7. A/D conversion means 205 converts analog output of the ion current detection circuit into digital form and outputs the digital signal to the misfire determination means 206. The misfire determination means 206 determines whether or not a misfire occurs in each cylinder of the engine based on the ion current value from the sensing circuit means 210, and outputs an output signal of the determination result to monitor processing means 204 and sensing circuit failure determination means 207. The monitor processing means 204 always performs monitor diagnosis processing of monitoring the relationship between the engine operation state and the control amount based on output signals from various sensors and the output signal from the misfire determination means 206 and detecting an anomaly of the various sensors or the control contents; in the monitor result, output control of fuel cutting, etc., is affected by output control means 203. The sensing circuit failure determination means 207 makes a sensing circuit failure diagnosis. In the failure diagnosis, whether or not the sensing circuit is abnormal is determined from the relationship between the combustion state determination result of the misfire determination means 206 and any other operation state based on a predetermined operation state signal and if it is determined that the sensing circuit is abnormal, a warning lamp 123 is turned on based on comparison with an output signal from a lighting condition 208, prompting the operator to make repair.

In the flowchart of FIG. 8, first at step 601, the current misfire determination is input and whether the condition is normal or a misfire is determined. If the condition is normal combustion, control proceeds to steps 610 and later, but the contents differ from the contents of the invention and therefore will not be discussed here. If it is determined that the condition is a misfire, control goes to step 602 and the time interval of a reference sensor 105 is measured and control goes to step 603. At step 603, the time interval measurement conditions of the reference sensor 105 are checked. That is, whether or not the engine speed is in a predetermined range, whether or not the vehicle speed is constant, and whether or not engine load fluctuation is in a predetermined range are determined. At step 604, if predetermined conditions are satisfied, the reference sensor interval of the cylinder wherein misfire is detected is compared with that of any other cylinder. If the interval difference is less than a predetermined value, control goes to step 605. At step 605, it is determined that the engine itself does not misfire and that the ion current detection circuit or a harness fails. If the interval difference is equal to or greater than the predetermined value, control goes to step 606 and it is determined that the engine misfires.

In the apparatus in the related art, if it is determined that the condition is a misfire based on an ion current, a failure diagnosis is made based on rotation fluctuation; to improve the failure diagnosis reliability, namely, the reliability of misfire determination based on rotation fluctuation, it is necessary to calibrate operational expressions and operational coefficients and particularly in a multi-cylinder engine, there is a problem of increasing the number of calibration steps.

SUMMARY OF THE INVENTION

The present invention has been made in consideration of the above-mentioned problem, and has the object of offering a misfire detection apparatus which can decrease the number of calibration steps and can make the combustion misfire determination with a high-reliability.

A misfire detection apparatus of an internal combustion engine according to an aspect of the invention includes at least one angle sensor for detecting rotation angle of the internal combustion engine, at least one Electronic Control Unit for performing fuel injection and ignition control based on rotation information of the angle sensor, plural ignition coils for generating a high voltage for ignition based on a drive signal from the Electronic Control Unit and plural spark plugs, as the high voltage for ignition of the ignition coil is applied, for generating an ignition spark and igniting an air fuel mixture. The misfire detection apparatus also includes bias means for applying a bias voltage for ion current detection to the spark plug, ion current detection means for detecting ion current, misfire determination means for making a misfire determination based on output signal of the ion current detection means, and failure determination means for making a failure determination of the misfire determination means. The failure determination means make the failure determination based on time change of rotation information of the internal combustion engine when the misfire determination means determines that a misfire occurs successively in a specific cylinder of the internal combustion engine.

According to this aspect of the invention, a failure diagnosis in the necessary minimum state is conducted only under a specific operation condition, so that the number of calibration steps of rotation fluctuation calculation can be decreased.

A misfire detection apparatus of an internal combustion engine according to another aspect of the invention includes at least one oxygen concentration sensor for detecting oxygen concentration in exhaust gas of the internal combustion engine, at least one Electronic Control Unit for performing fuel injection and ignition control, plural ignition coils for generating a high voltage for ignition based on a drive signal from the Electronic Control Unit, and plural spark plugs, as the high voltage for ignition of the ignition coil is applied, for generating an ignition spark and igniting air fuel mixture. The misfire detection apparatus also includes bias means for applying a bias voltage for ion current detection to the spark plug, ion current detection means for detecting ion current, misfire determination means for making a misfire determination based on output signal of the ion current detection means, and failure diagnosis means for determining whether it is a true misfire or failure of misfire detection caused by the ion current. The determination of the failure diagnosis means is carried out based on the oxygen concentration in the exhaust gas of the internal combustion engine when the misfire determination means detects a misfire.

According to this aspect of the invention, a failure determination is made based on the oxygen concentration in exhaust gas of an internal combustion engine. Therefore, a failure diagnosis can be conducted in a smaller number of calibration steps without specifying any operation condition.

BRIEF DESCRIPTION OF THE DRAWINGS

FIG. 8 is a flowchart to show the apparatus in the related art.

DETAILED DESCRIPTION OF THE PREFERRED EMBODIMENTS

First Embodiment

Figure 1:
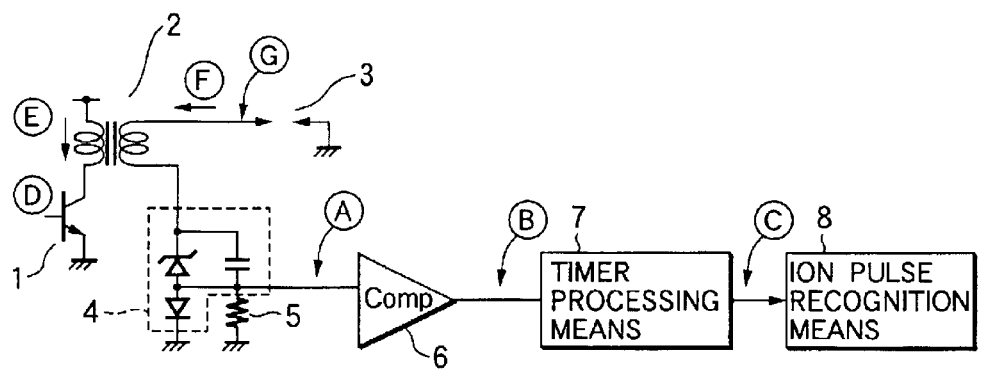
FIG. 1 is a drawing to show the configuration of a first embodiment of the invention.
Figure 2:
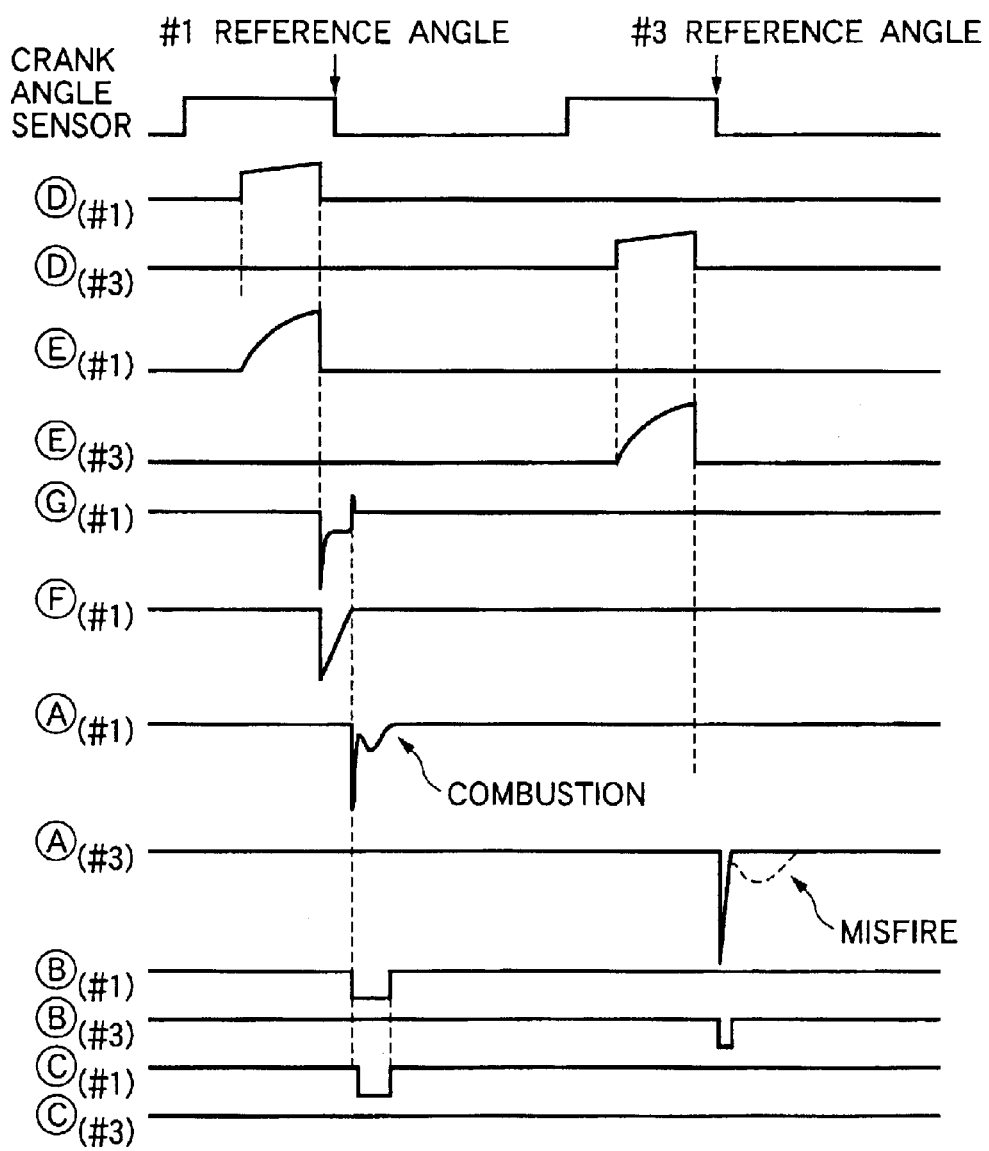
FIG. 2 is a timing chart to show the first embodiment of the invention.
Figure 3:
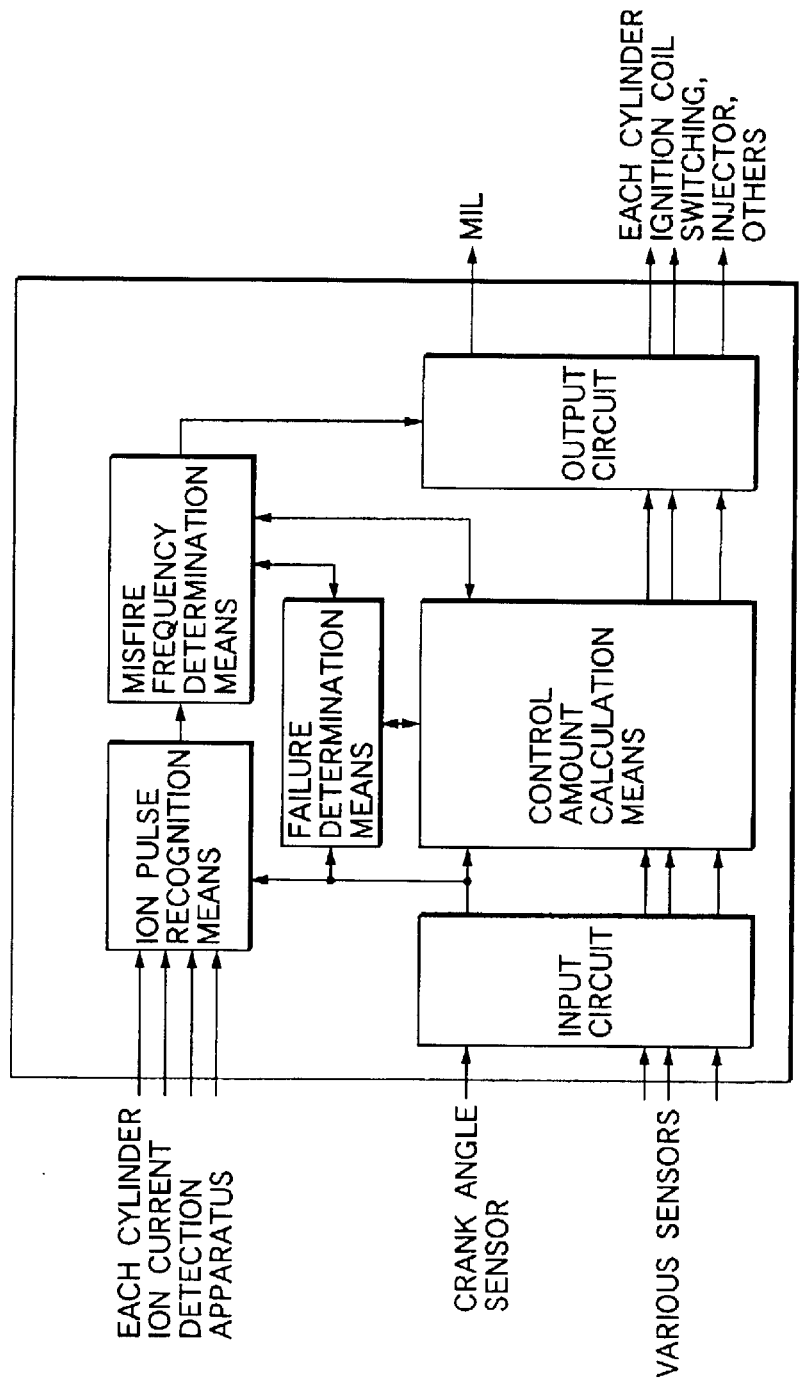
FIG. 3 is a block diagram to show the first embodiment of the invention.
Figure 4:
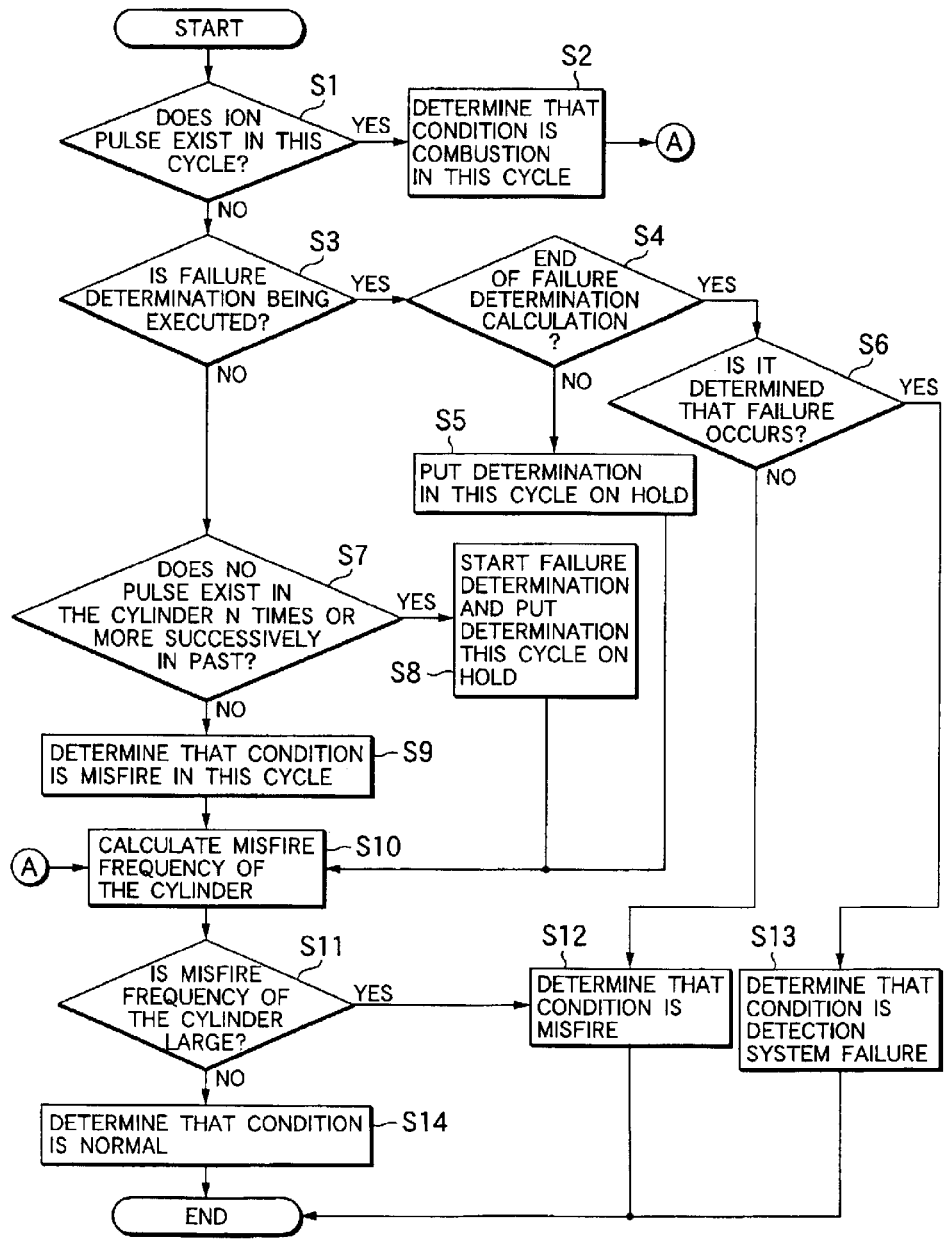
FIG. 4 is a flowchart to show the first embodiment of the invention.

FIG. 1 shows an ion current detection apparatus of a first embodiment of the invention, FIG. 2 is an operation timing chart of the ion current detection apparatus of the first embodiment of the invention, FIG. 3 is a block diagram of the first embodiment of the invention, and FIG. 4 is a misfire frequency determination flowchart of the first embodiment of the invention.

In FIG. 1, numeral 1 denotes a switching element, numeral 2 denotes an ignition coil, numeral 3 denotes a spark plug, numeral 4 denotes a bias circuit consisting of a Zener diode, a capacitor, and a diode, numeral 5 denotes an ion current detection resistor, numeral 6 denotes comparison means including a comparator, numeral 7 denotes timer processing means, and numeral 8 denotes ion pulse recognition means.

The switching element 1, the ignition coil 2, and the spark plug 3 shown in FIG. 1 are placed for each cylinder. The ion current detection apparatus consisting of the bias circuit 4, the ion current detection resistor 5, the comparison means 6, and the timer processing means 7 is placed for each cylinder.

When an ignition signal D shown in FIG. 2 is applied to the switching element 1 and a primary current E flows into a primary winding of the ignition coil 2 and the ignition signal D becomes a zero voltage at the ignition time, the primary current E is shut off. Energy stored in the ignition coil 2 causes secondary coil to produce a high voltage and as the high voltage is applied, discharge is produced between electrodes of the spark plug 3, and an air fuel mixture in the cylinder is ignited. At this time, the capacitor in the bias circuit 4 is charged by a secondary current F flowing into a secondary winding of the ignition coil 2. The maximum voltage of the capacitor is limited by the Zener diode connected in parallel with the capacitor. After termination of the discharge between the electrodes of the spark plug, the bias voltage stored in the capacitor is applied to spark plug center electrode and an ion current flows by the action of ions generated by combustion in the cylinder. The ion current is converted into a voltage by the detection resistor 5, the voltage is converted into a pulse by the comparison circuit 6, a pulse generated by a noise current is cut by the timer processing means 7, and whether or not a pulse is generated by the ion current is determined by the ion pulse recognition means 8, whereby combustion misfire can be determined. As shown in FIG. 2, a pulse occurs at the combustion time (#1), but no pulse occurs at the misfire time (#3). The ion pulse recognition means 8 determines whether or not a pulse exists in the time period from #1 reference angle to #3 reference angle of a crank angle sensor shown in FIG. 2 for the ion pulse signal of the first cylinder. Misfire frequency determination means makes a misfire state determination based on the determination result. It requests failure determination means to make a failure determination only when the ion pulse recognition means 8 determines that no pulse occurs a predetermined number of successive times or more for a specific cylinder. The possible situation in which the ion pulse recognition means 8 determines that no pulse occurs a predetermined number of successive times or more for a specific cylinder is a true misfire caused by a failure of ignition coil wiring or the ignition coil itself or a misfire detection system failure such as a wiring failure between the ignition coil and the ion current detection apparatus, a wiring failure between the ion current detection apparatus and a controller, or a failure of the ion current detection apparatus itself, and a failure determination needs to be made.

The failure determination means measures the time from the reference angle to the next reference angle shown in FIG. 2. If the measurement time fluctuation is equal to or greater than a predetermined value, the failure determination means determines that the condition is a true misfire and if the measurement time fluctuation is less than the predetermined value, the failure determination means determines that the condition is a misfire detection system failure, and outputs the determination result to the misfire frequency determination means and control amount calculation means.

Accordingly, when the control amount calculation means performs countermeasure control such as inhibition of fuel injection into the cylinder at the misfire detection time, if the failure determination means determines that the condition is a misfire detection system failure, it is also made possible to control so as to continue injection into the cylinder. Although MIL goes on regardless of whether the determination indicates a misfire detection system failure or a true misfire, which failure mode can be determined by the failure determination means, so that the failure code can be sorted for storage.

FIG. 4 is a misfire frequency determination flowchart.

A determination is made as to whether or not the ion pulse recognition means 8 recognizes the presence of an ion pulse in the current combustion stroke cycle (S1). If an ion pulse exists, a failure determination should also be made, but this is not the contents of the invention and will not be discussed. In this case, it is determined that the condition is normal combustion (S2) and the control goes to calculation of misfire frequency of the cylinder (S10).

If the ion pulse recognition means 8 recognizes the absence of an ion pulse in the current combustion stroke cycle, a determination is made as to whether or not the failure determination means is already performing failure determination calculation. (S3). If the failure determination means does not perform failure determination calculation, a determination is made as to whether or not it is determined that no pulse exists in the cylinder n times or more successively in the past (S7). If it is determined that no pulse exists in the cylinder n times or more successively, the failure determination means is requested to make a failure determination, and this combustion misfire determination is put on hold (S8). If it is not determined that no pulse exists in the cylinder n times or more successively, this time it is determined that the condition is a misfire (S9). In either case, misfire frequency calculation of the cylinder is performed (S10). Whether or not the misfire frequency of the cylinder is a predetermined frequency or more is determined (S11). If the misfire frequency is less than the predetermined frequency, it is determined that the condition is normal (S14) and the MIL is not turned on.

If the failure determination means performs failure determination calculation, whether or not the failure determination terminates is determined (S4). If the failure determination does not terminate, combustion misfire determination in this cycle is put on hold and control goes to misfire frequency calculation of the cylinder (S10). In the calculation of the failure determination means, if failure determination is made based on change in rotation information of the internal combustion engine, it is possible to make a high-reliability combustion misfire determination in easy calibration in an area wherein rotation is sufficiently low and the throttle opening is low (load is low).

The failure determination terminates and the failure determination result is checked (S6). If it is determined that a failure occurs, the failure is a misfire detection system failure (S13); if it is not determined that a failure occurs, it is determined that the condition is a misfire (S12). In either case, the MIL is turned on, prompting the, operator to make repair.

Second Embodiment

Figure 5:
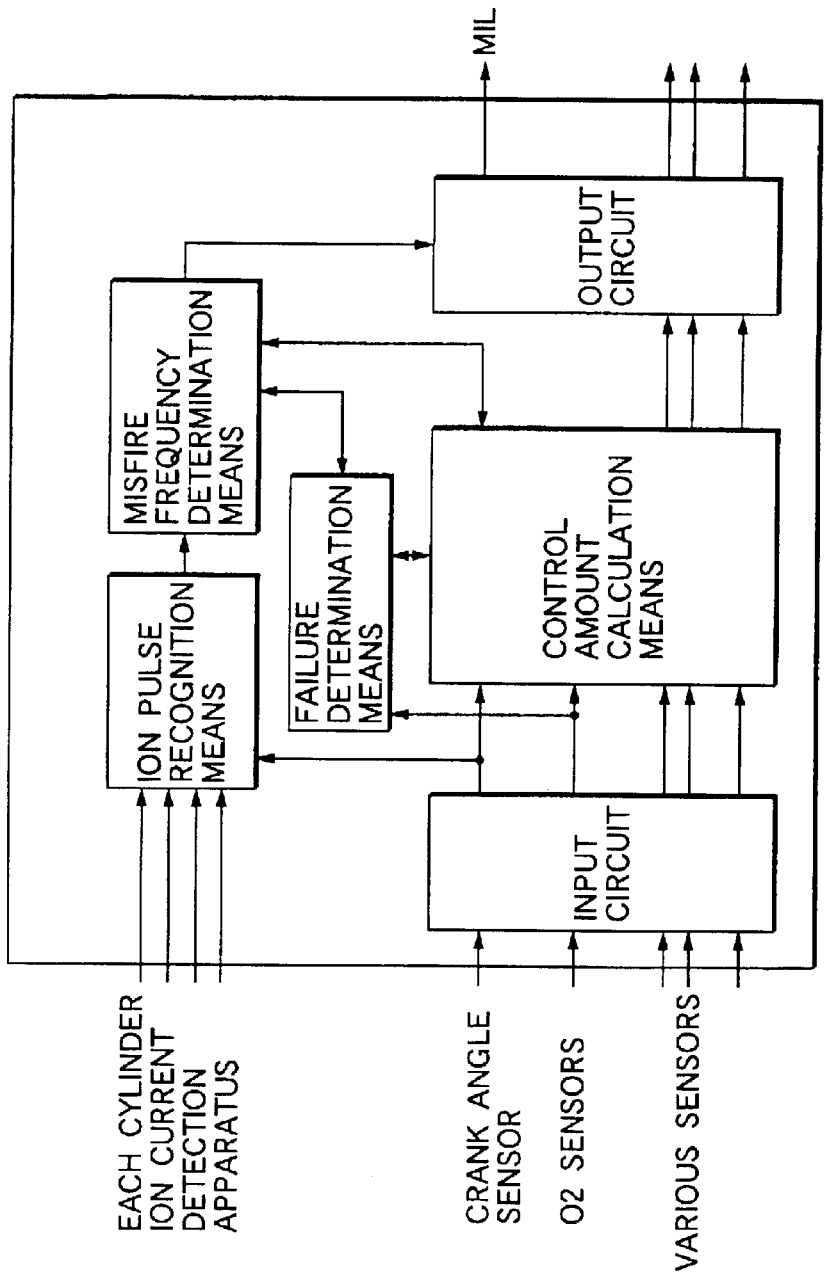
FIG. 5 is a block diagram to show a second embodiment of the invention.
Figure 6:
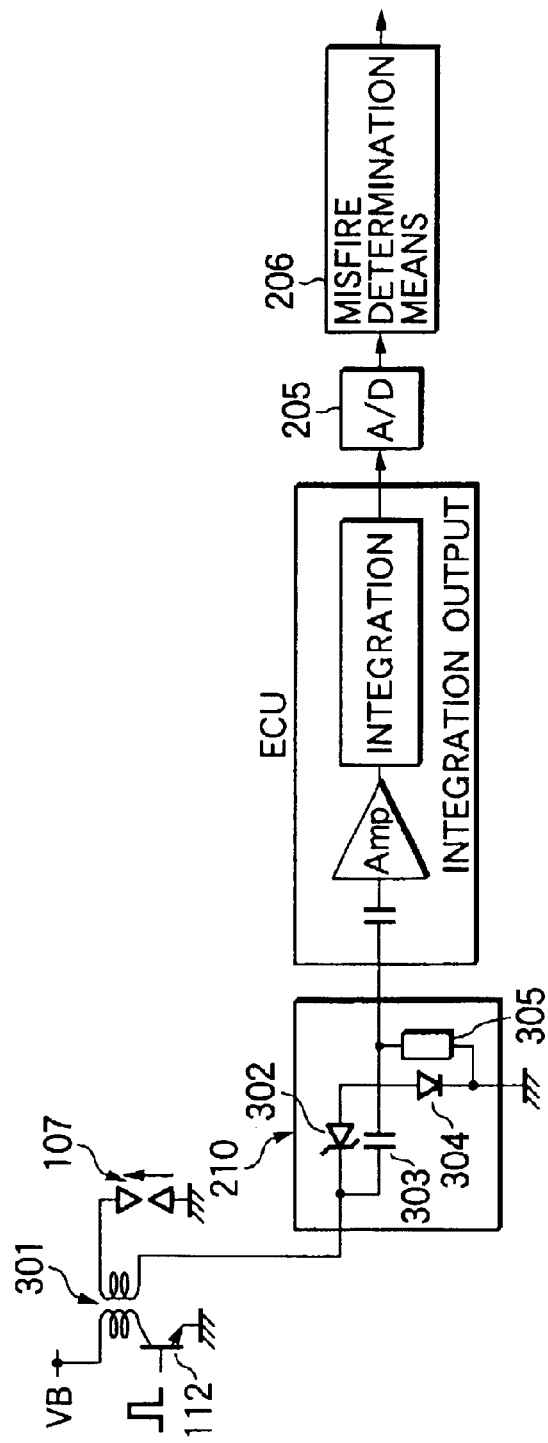
FIG. 6 is a drawing to show the configuration of an apparatus in a related art.
Figure 7:
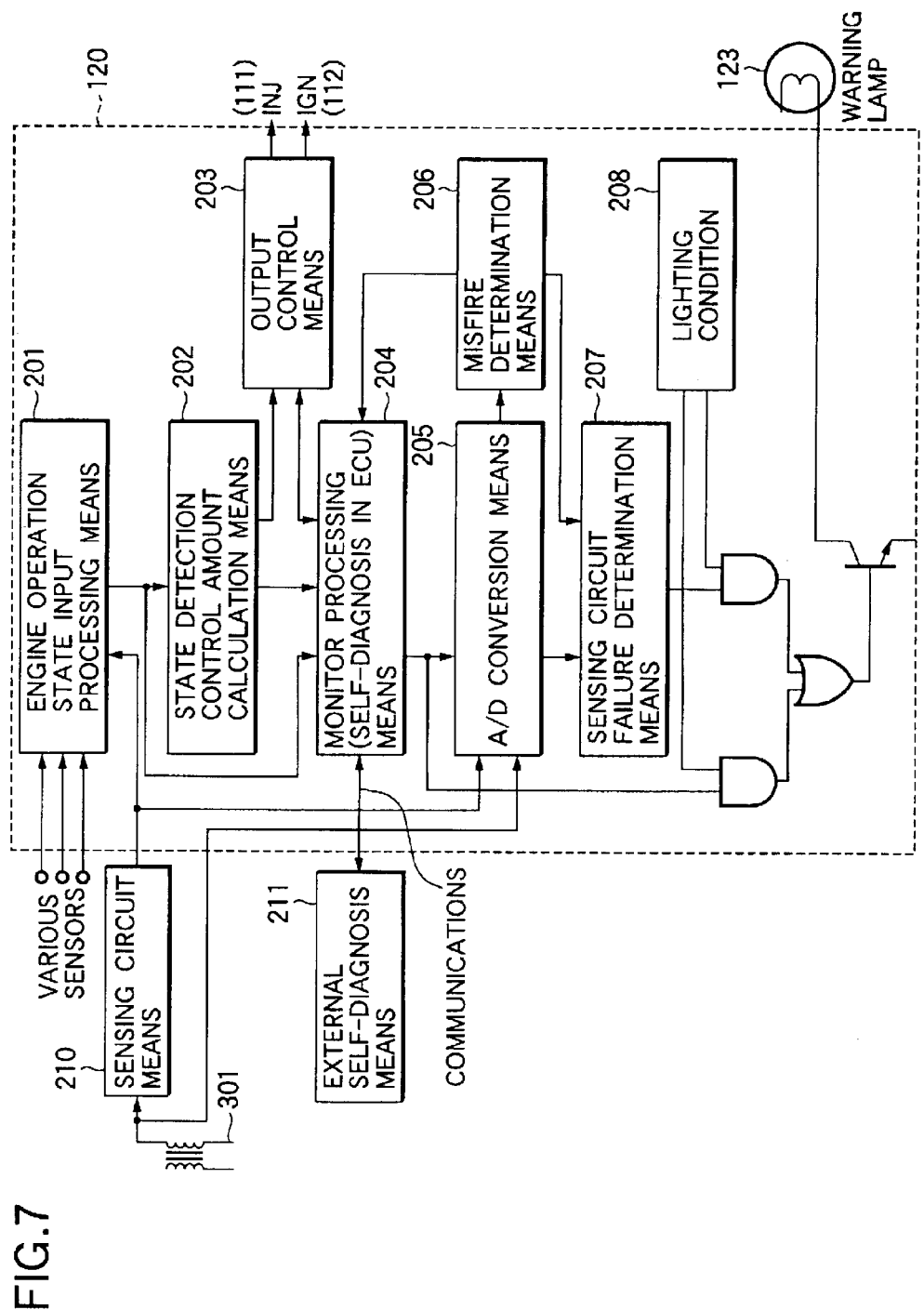
FIG. 7 is a block diagram to show the apparatus in the related art.

FIG. 5 is a block diagram to show a second embodiment of the invention.

In the second embodiment, upon reception of a request for making a failure determination from misfire frequency determination means, failure determination means makes a failure determination based on the output voltage A/D value of an O2 sensor installed in an exhaust pipe. Used as the O2 sensor is a sensor for outputting a high signal of less than 1 V when the oxygen concentration is low and a low signal of 0 V or more when the oxygen concentration is high with the theoretical air-fuel ratio as the boundary. If a specific cylinder misfires consecutively, combustion in the cylinder is not conducted and an air fuel mixture is exhausted intact and thus a large amount of oxygen exists in the proximity of the O2 sensor and the O2 sensor outputs a low signal. Therefore, if at least the O2 sensor output A/D value in the exhaust stroke of the target cylinder is continuously low, the failure determination means can determine that the condition is a true misfire; otherwise, the failure determination means can determine that the condition is a misfire detection system failure.

Therefore, as compared with failure determination based on change in rotation information of an internal combustion engine, failure determination can be made without requiring complicated calibration and without specifying any operation conditions.

What is claimed is:

1. A misfire detection apparatus of an internal combustion engine, comprising:
    at least one angle sensor for detecting rotation angle of the internal combustion engine;
    at least one an Electronic Control Unit for performing fuel injection and ignition control based on rotation information of the angle sensor;
    plural ignition coils for generating a high voltage for ignition based on a drive signal from the Electronic Control Unit;
    plural spark plugs, as the high voltage for ignition of the ignition coil is applied, for generating ignition spark and igniting air fuel mixture;
    bias means for applying a bias voltage for ion current detection to the spark plug;
    ion current detection means for detecting ion current;
    misfire determination means for making a misfire determination based on output signal of the ion current detection means;
    failure determination means for making a failure determination of the misfire determination means based on time change of rotation information of the internal combustion engine when the misfire determination means determines that misfires occur successively in a specific cylinder of the internal combustion engine.

2. The misfire detection apparatus as claimed in claim 1 wherein
    if the misfire is determined based on time change of the rotation information when the misfire determination means determines that a misfire occurs successively in the specific cylinder, the failure determination means determines that the condition is a true misfire.

3. The misfire detection apparatus as claimed in claim 1 wherein
    the failure determination of the failure determination means is carried out when the engine speed is equal to or less than a specific value.

4. A misfire detection apparatus of an internal combustion engine, comprising:
- at least one oxygen concentration sensor for detecting oxygen concentration in exhaust gas of the internal combustion engine;
- at least one Electronic Control Unit for performing fuel injection and ignition control;
- plural ignition coils for generating a high voltage for ignition based on a drive signal from the Electronic Control Unit;
- plural spark plugs, as the high voltage for ignition of the ignition coil is applied, for generating an ignition spark and igniting air fuel mixture;
- bias means for applying a bias voltage for ion current detection to the spark plug;
- ion current detection means for detecting ion current;
- misfire determination means for making a misfire determination based on output signal of the ion current detection means; and
- failure diagnosis means, when the misfire determination means detects a misfire, for determining whether it is a true misfire or failure of misfire detection based on ion current based on the oxygen concentration in the exhaust gas of the internal combustion engine.

5. The misfire detection apparatus as claimed in claim 4 wherein
when the misfire determination means detects a misfire, the failure determination means determines that it is a true misfire if the oxygen concentration in the exhaust gas of the internal combustion engine is high, and determines that it is failure of misfire detection based on ion current if the oxygen concentration in the exhaust gas of the internal combustion engine is not high.

6. The misfire detection apparatus as claimed in claim 4 wherein
the failure determination means judges that if it is only when the misfire determination means detects a misfire successively in a specific cylinder of the internal combustion engine.

7. The misfire detection apparatus as claimed in claim 6 wherein
the failure determination means makes a failure determination based on the oxygen concentration in the exhaust gas of the internal combustion engine in a predetermined time period after the misfire determination means starts misfire determination consecutively for a specific cylinder of the internal combustion engine.

* * * * *